United States Patent
Calamita et al.

(10) Patent No.: US 7,290,872 B2
(45) Date of Patent: Nov. 6, 2007

(54) SYSTEM AND METHOD FOR DELIVERING PHASE CHANGE INK TO MULTIPLE PRINTHEADS

(75) Inventors: James P. Calamita, Spencerport, NY (US); Daniel W. Costanza, Webster, NY (US); Roger G. Leighton, Rochester, NY (US); Michael E. Leo, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 354 days.

(21) Appl. No.: 11/093,620

(22) Filed: Mar. 30, 2005

(65) Prior Publication Data

US 2006/0221156 A1    Oct. 5, 2006

(51) Int. Cl.
*B41J 2/09* (2006.01)
(52) U.S. Cl. ........................................... 347/88
(58) Field of Classification Search ............ 347/1, 347/85, 86, 87, 88
See application file for complete search history.

(56) References Cited

U.S. PATENT DOCUMENTS

| | | | |
|---|---|---|---|
| 4,593,292 A | * | 6/1986 | Lewis ........................ 347/88 |
| 4,636,803 A | | 1/1987 | Mikalsen |
| 4,739,339 A | | 4/1988 | DeYoung et al. |
| 5,105,209 A | * | 4/1992 | Koto et al. .................... 347/70 |
| 5,341,164 A | * | 8/1994 | Miyazawa et al. ............ 347/88 |
| 5,541,624 A | * | 7/1996 | Cooke et al. .................. 347/88 |
| 6,902,246 B2 | * | 6/2005 | Varnon et al. ................. 347/1 |
| 7,011,399 B2 | * | 3/2006 | Godil et al. ................... 347/88 |
| 2004/0114007 A1 | | 6/2004 | Leighton |
| 2004/0114008 A1 | | 6/2004 | Leighton |

* cited by examiner

*Primary Examiner*—Anh T. N. Vo
(74) *Attorney, Agent, or Firm*—Fay Sharpe LLP

(57) ABSTRACT

A system and method for delivering phase change ink to a plurality of printheads is provided. The system includes an ink source having a housing for holding solid phase change ink, an ink melter assembly having a heated ink contact portion for melting the solid phase change ink and a drip point. The system also includes a first conduit for transferring the melted ink to a first printhead, and a second conduit for transferring the melted ink to a second printhead. The method includes melting a solid phase change into the liquid phase, transferring the liquid phase change ink to the first printhead in a first conduit, transferring liquid phase change ink to the second printhead in a second conduit. The solid phase change ink can be stored in a single ink source.

17 Claims, 5 Drawing Sheets

US 7,290,872 B2

SYSTEM AND METHOD FOR DELIVERING PHASE CHANGE INK TO MULTIPLE PRINTHEADS

BACKGROUND

Image producing machines, such as printers and/or copiers and the like, often use printheads for ejecting ink onto an ink receiving surface, such as print media also referred to as the substrate, or an image drum which is then transferred to the print media, to form an image thereon. Some image producing machines use as phase change ink, also referred to solid ink. The solid ink is in the solid phase at ambient temperature and is melted to a liquid phase at an elevated, operating temperature. At the operating temperature, droplets or jets of the molten liquid ink are ejected from one or more printhead front faces to form the image. When the ink droplets contact the surface of the substrate, they quickly solidify to create an image in the form of a predetermined pattern of solidified ink drops.

An example of such a phase change ink image producing machine or printer, and the process for producing images therewith onto image receiving sheets is disclosed in U.S. Pat. No. 5,372,852 issued Dec. 13, 1994 to Titterington et al. As disclosed therein, the phase change ink printing process includes raising the temperature of a solid form of the solid ink so as to melt it and form a liquid ink. It also includes applying droplets of the solid ink in a liquid form onto an imaging surface in a pattern using a device such as an ink jet printhead. The process then includes transferring the image to the receiving substrate, solidifying, and fixing the solid ink to the substrate.

Typically, phase change ink image producing machines use a single print engine with a printhead that is fed by a single ink source/melter unit. The ink melter is typically positioned in close proximity to the printhead, so as the ink melts, it is deposited directly into the printhead ink reservoir.

However, some image forming machines use a plurality of printheads to form images. For example, each printhead in these machines may only be used to produce a portion of the image thereby increasing the image print speed of the machine. Furthermore, some image forming machines also print in color, using several different base color inks to print a color image.

It is desirable to provide a system and method of distributing phase change ink to a plurality of printheads.

BRIEF DESCRIPTION

A system for delivering phase change ink to a plurality of printheads is provided. The system includes an ink source having a housing for holding solid phase change ink, an ink melter assembly having a heated ink contact portion for melting the solid phase change ink and a drip point. The system also includes a first conduit for transferring the melted ink to a first printhead, and a second conduit for transferring the melted ink to a second printhead.

The system can include a mover connected to the ink melter assembly for moving the drip point between a first-position wherein the first conduit ink receiving portion receives ink from the drip point and a second position wherein the second conduit ink receiving portion receives ink from the drip point.

The system can include a diverter disposed between the drip point and the first and second conduit receiving portions for diverting ink coming from the drip point to the first and second conduits.

A method for delivering phase change ink to a plurality of printheads is provided. The method includes melting solid phase change into the liquid phase, transferring the liquid phase change ink to the first printhead in a first conduit and transferring the liquid phase change ink to the second printhead in a second conduit.

The method can include melting the ink with a melter having a drip point and moving the drip point between a first position for transferring the liquid phase change ink to the first printhead in the first conduit and a second position for transferring the liquid phase change ink to the second printhead in the second conduit.

The method can include diverting the ink from the drip point with a diverter and moving the diverter between a first position for diverting the ink to the first conduit and a second position for diverting the ink to the second conduit.

DETAILED DESCRIPTION

Figure 1:
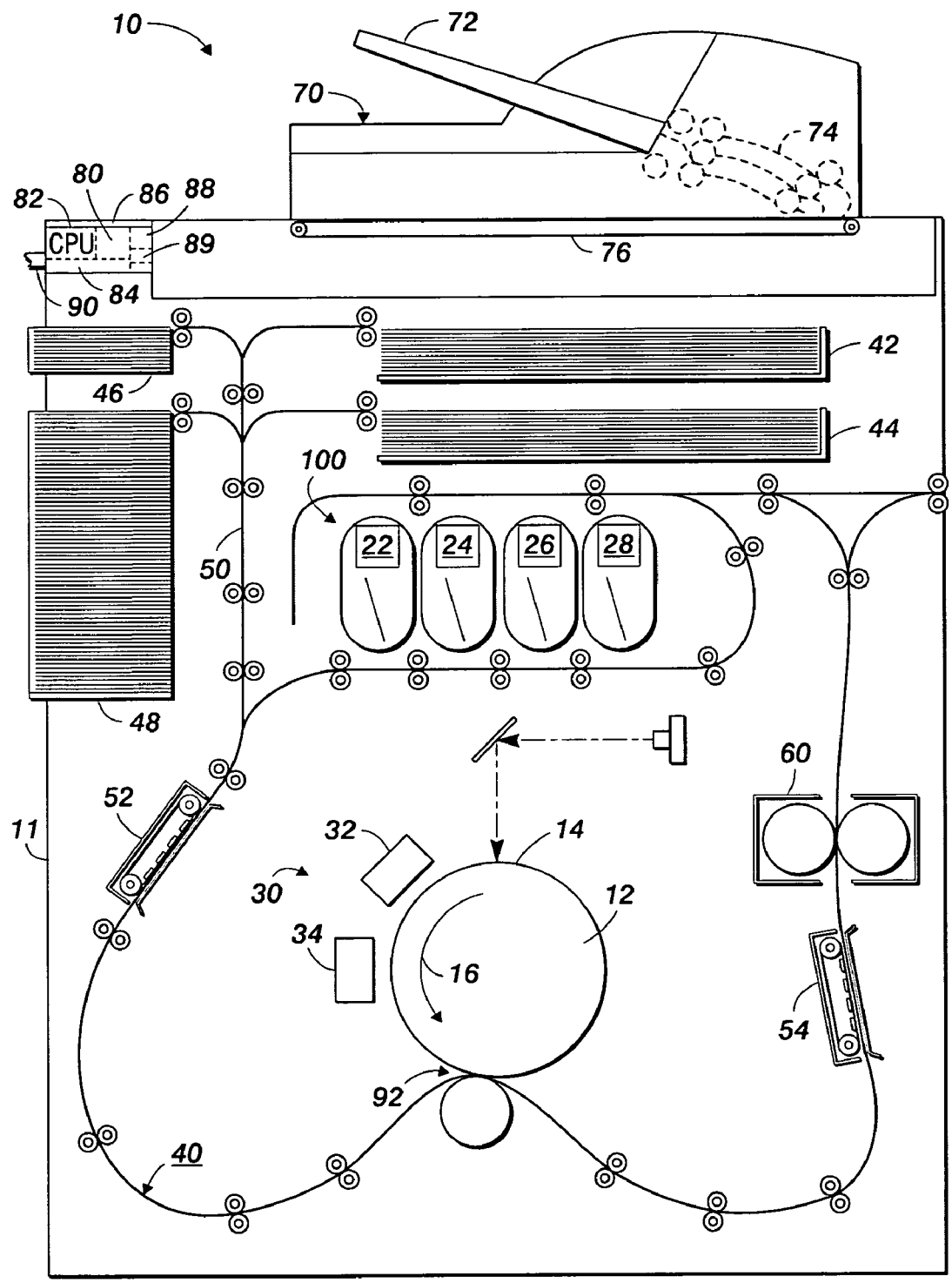
FIG. 1 is block diagram of an image producing machine having a system for delivering phase change ink to a plurality of printheads.

With reference to FIG. 1, there is illustrated a phase change ink, also referred to as a solid ink, image producing machine 10. The image producing machine 10 can be a machine copier, printer, or multifunction device, among others, using molten solid ink to form an image on a substrate as described below.

The image producing machine 10 includes a frame 11 to which are mounted directly or indirectly its operating subsystems and components, as will be described below. The image producing machine 10 includes an imaging member 12 that is shown in the form of a drum, but can equally be in the form of a supported endless belt. The imaging member 12 has an imaging surface 14, also referred to herein as an ink receiving surface, which receives molten solid ink ejected from printheads 30 to form images. The receiving surface 14 is movable with respect to the printheads 30 along a receiving surface path as shown by arrow 16.

The image producing machine 10 also includes an ink delivery system 100 that has a source of at least one color solid ink in solid form. In the examples provided, the image producing machine 10 is a multicolor image producing machine having an ink delivery system 100 which includes four sources 22, 24, 26, 28 holding four different colors CYMK (cyan, yellow, magenta, black) of solid inks. The ink delivery system 100 also includes a melting apparatus for melting or phase changing the solid ink from a solid form into a liquid form as described in further detail below. The ink delivery system 100 is suitable for supplying the ink in liquid form to a plurality of printheads 30 which eject the ink onto the receiving surface 14 when forming an image. In other applicable examples, the receiving surface 16 can be the substrate. In these examples, the receiving surface path 16 can be the path taken by the substrate during the image forming process which can be referred to as the substrate path, also referred to as the substrate handling path, also referred to as the paper path.

The image producing machine 10 also includes a substrate supply and handling system 40. The substrate supply and handling system 40 can include a plurality of substrate supply sources 42, 44, 46, 48, of which supply source 48, for example, is a high capacity paper supply or feeder for storing and supplying image receiving substrates in the form of cut sheets. The substrate supply and handling system 40 can include a substrate handling and treatment system 50 that has a substrate pre-heater 52, substrates and image heater 54, and a fusing device 60. The image producing machine 10 can also include an original document feeder 70 that has a document holding tray 72, document sheet feeding and retrieval devices 74, and a document exposure and scanning system 76.

Operation and control of the various subsystems, components and functions of the image producing machine 10 are performed with the aid of a controller 80. The controller 80 can be a self-contained, dedicated computer having a central processor unit (CPU) 82, electronic storage 84, and a display or user interface (UI) 86. The controller 80 can include sensor input and control means 88 as well as a pixel placement and control means 89. The CPU 82 reads, captures, prepares and manages the image data flow between image input sources such as the scanning system 76, or an online or a work station connection 90, and the printheads 30. As such, the controller 80 is the main multi-tasking processor for operating and controlling machine subsystems and functions, including the operation of the ink delivery system 100. Decisions about when to fill each printhead would be made by the controller 80 based on input from ink level sensors located in the individual printhead reservoirs.

In operation, image data for an image to be produced is sent to the controller 80 from, for example, the scanning system 76 or via a work station network connection 90 for processing and output to the printheads 30. Additionally, the controller 80 determines and/or accepts related subsystem and component controls, for example from operator inputs via the user interface 86, and accordingly executes such controls. As a result, appropriate color solid forms of phase change ink are melted and delivered to the printheads 30 via the ink delivery system 100 as described in detail below. Additionally, pixel placement control is exercised relative to the imaging surface 14 thus forming desired images per such image data, and receiving substrates are supplies by the sources 42, 44, 46, 48 and handled by means 50 in timed registration with image formation on the surface 14. Finally, the image is transferred within the transfer nip 92, from the receiving surface 14 onto the substrate for subsequent fusing at fusing device 60.

The image producing machine 10 described in this example is a high-speed, or high throughput, multicolor image producing machine, having two printheads 32, 34, referred to collectively as printheads 30, although it should be appreciated that the ink delivery system 100 can be used to provide ink to more than two printheads 30 which may be imaging on more than one imaging surface 14. Each printhead 32, 34 has a corresponding front face (not shown) for ejecting ink onto the receiving surface 14 as the receiving surface travels along the receiving surface path 16 to form an image.

Figure 2:
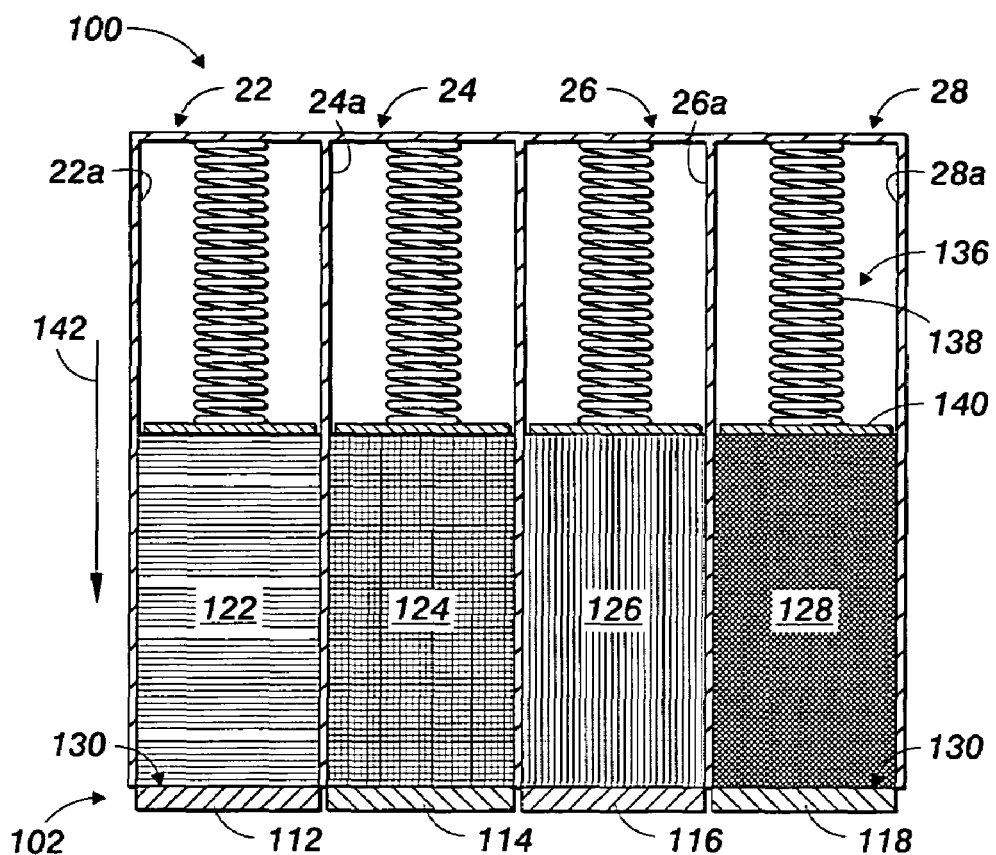
FIG. 2 is top view of four ink sources and a melter assembly having four melter plates.
Figure 3:
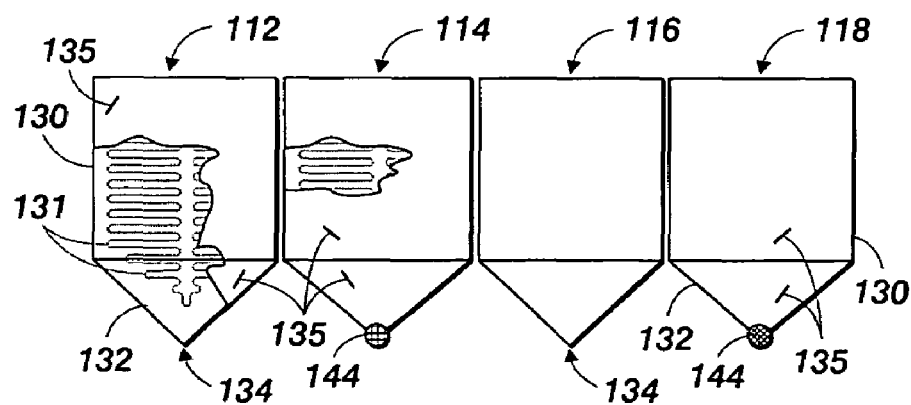
FIG. 3 is side view of the four melter plates illustrating the drip points.
Figure 4:
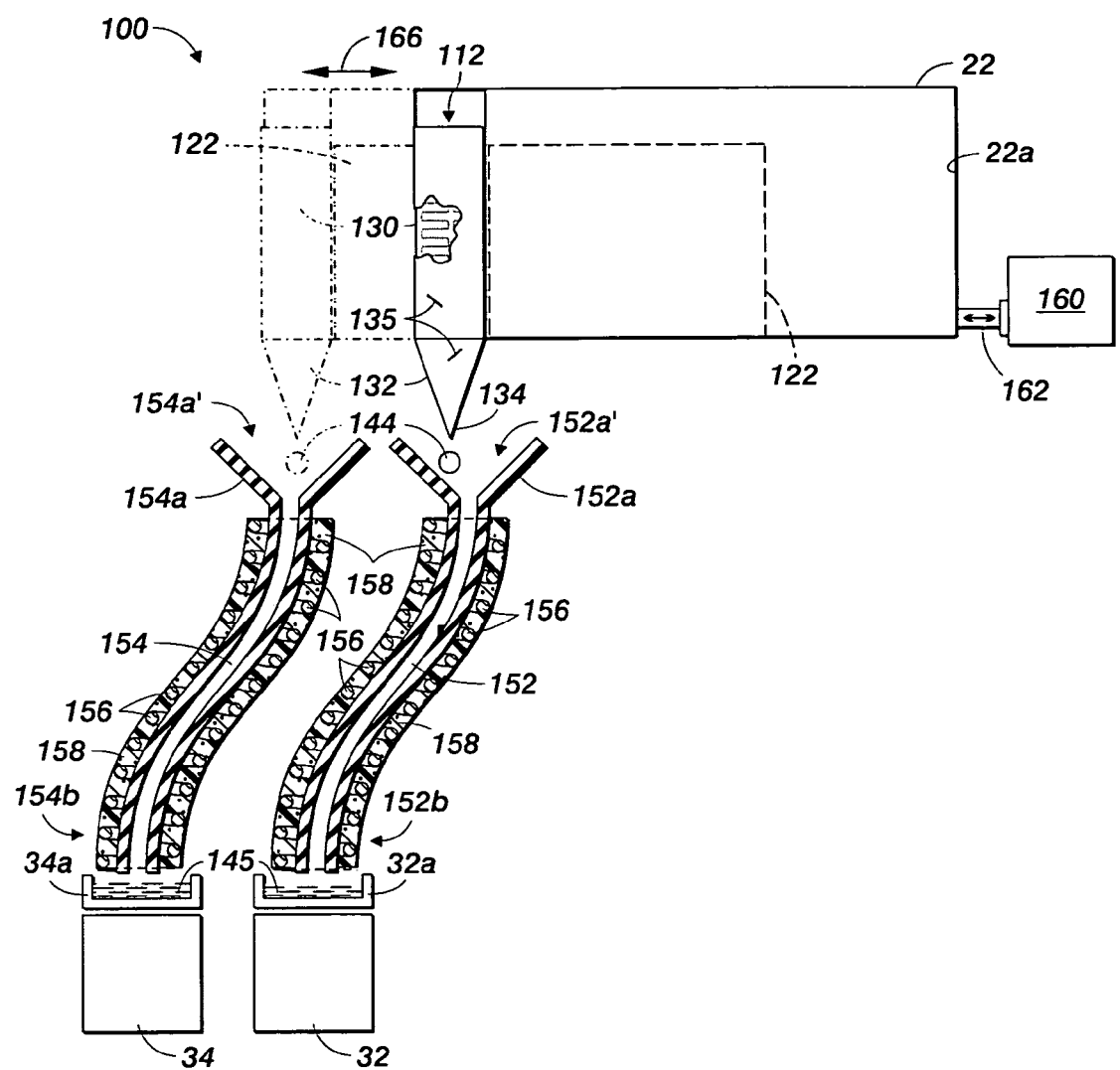
FIG. 4 is a block diagram of an embodiment of the system for delivering phase change ink illustrating the translating the ink source and melter assembly between first and second positions.

Referring now to FIGS. 2-4, the ink delivery system 100 of the present example includes four ink sources 22, 24, 26, 28, each holding a different phase change ink in solid form, such as for example inks of different colors. However, it should be appreciated that the ink delivery system 100 can include any suitable number of ink sources, each capable of holding a different phase change ink in solid form. The different solid inks are referred to herein by their colors as CYMK, including cyan 122, yellow 124, magenta 126, and black 128. Each ink source can include a housing, such as for example trays 22a, 24a, 26a, 28a, for storing each solid ink separately from the others. The solid inks 122, 124, 126, 128 are shown in block form, though it should be appreciated that the solid phase change ink can be stored in other formats, including but not limited to, pellets and granules, among others.

The ink delivery system 100 includes a melter assembly, shown generally at 102. The melter assembly 102 includes a melter, such as a melter plate, connected to the ink source for melting the solid phase change ink into the liquid phase. In the example provided herein, the melter assembly 102 includes four melter plates, 112, 114, 116, 118 each corresponding to a separate ink source 22, 24, 26 and 28 respectively, and connected thereto. For example, the melter plates can be within the ink source housings. As shown in FIG. 3, each melter plate 112, 114, 116, 118 includes an ink contact portion 130 and a drip point portion 132 extending below the ink contact portion and terminating in a drip point 134 at the lowest end. The drip point portion 132 can be a narrowing portion terminating in the drip point.

Each ink source 22, 24, 26, 28 can also include a biasing system 136 for biasing the solid phase change ink 122, 124, 126, 128 against the ink contact portion 130 of the corresponding melter plate 112, 114, 116, 118. In the example provided, the biasing system 136 includes a spring 138 acting against a movable wall 140 for pushing the ink against the melter plate contact portion 130 as shown by arrow 142, though it should be appreciated that other biasing systems can be contemplated, including those using gravity.

The melter plates 112, 114, 116, 118 can be formed of a thermally conductive material, such as metal, among others, that is heated in a known manner. In one example, which should not be considered limiting, one or more resistive heater wires 131 provide thermal energy to the plates 112, 114, 116, 118. The heating of the melter plates can be controlled by the controller 80 to achieve a temperature suitable for melting the solid phase change ink. The plates and resistive wires 131 can be covered in a flexible material 135, such as rubber or a rubber-like material. As each color ink melts it adheres to its corresponding melter plate 112, 114, 116 118, and gravity moves the liquid ink down to the drip point 134 which is disposed lower than the contact portion. The liquid phase change ink then drips from the drip point 134 in drops shown at 144. Although the examples provided herein describe the melted liquid ink as dripping from the drip point 134 in separate drops 144, the ink may melt fast enough so that the liquid ink flows from the drip point in a stream, which would also suffice for delivering the ink to the printheads.

Referring now to FIG. 4, the ink delivery system 100 also includes a plurality of ink delivery conduits 152 and 154, each corresponding to a different printhead 32 and 34. The ink delivery conduits 152,154 can be tubes, troughs, or other assemblies for delivering phase change ink in the liquid phase from the drip point 134 to ink reservoirs 32a and 34a disposed at each corresponding printhead, 32 and 34 respectively, as shown at 145. The ink delivery conduits 152 and 154 can be formed of a thermally conductive material, such as for example metal, among other materials, and can be heated to keep the phase change ink in the liquid form as it travels through the conduits. In one example, which should not be considered as limiting, the conduits 152, 154 can be heated by first wrapping the ink conduits with electrical wire 156 having a defined resistance and then wrapping the conduits and wire assembly with insulation 158. The electric wire 156 is supplied with the appropriate electric current to generate sufficient heat to maintain the ink in the conduits at the proper temperature. For simplicity, the construction and operation of a single ink source 22, and melter plate 112, and associated delivery conduits 152, 154 corresponding to two printheads 32, 34 shall be described. However, it should be appreciated that a plurality of ink sources, such as sources 22, 24, 26 and 28 each having an associated group of delivery conduits can be used to supply several inks to a plurality of printheads.

The conduits 152,154 include ink receiving portions 152a, 154a disposed below the drip point 134 for receiving drops of liquid ink 144 therefrom. The ink receiving portions 152a, 154a can be funnel shaped having the wider, open portions 152a', 154a' disposed adjacent each other and below the drip point 134 as shown. The open portions 152a', 154a' can be disposed adjacent each other to prevent liquid ink from running down between the conduits 152, 154. The conduits 152, 154 can also include ink dispensing portions 152b, 154b disposed at the ink reservoirs 32a 34a of the corresponding printheads 32, 34 which they supply. The ink receiving portions 152a, 154a are disposed higher than the ink dispensing portions 152b, 154b in the image forming machine 10. The liquid phase change ink travels through the heated conduits 152, 154 from the ink receiving portion 152a, 154a to the ink dispensing portion 152b, 154b and into the corresponding printhead reservoir 32a, 34a aided by gravity. The ink reservoirs 32a, 34a supply corresponding printheads 32 and 34, respectively, with the liquid phase change ink needed for printing images as described above.

The ink delivery system 100 also includes a mover 160 connected to the ink source 22, including the housing 22a, and the melter assembly 102, including the melting plate 112, via a linkage 162 for moving them between a first position and a second position. The mover 160 can be a motor, such as a stepper motor, or a solenoid, among others, capable of moving the ink source and melter assembly 102 as described. The mover 160 can be controlled by the controller 80 for moving the ink source 22 and melter assembly 102 from the first position to the second position and from the second position to the first position. In the first position, shown with solid lines, the melting plate drip point 134 is disposed above the first conduit ink receiving portion 152a. In the first position, drops of liquid ink 144 drip from the drip point 134 into the wider, open portion of the funnel shaped ink receiving portion 152a'. The liquid phase change ink then flows through the conduit 152 and out through the ink dispensing portion 152b into the ink reservoir 32a of the first printhead 32 thereby delivering the phase change to the printhead for forming images.

The mover 160 can move the ink source 22 and melter assembly 102 from the first position to the second position by translating them, that is moving them in a sideways motion as shown by the arrow 166. In the second position, shown with the dot-dashed lines, the melting plate drip point 134 is disposed above the second conduit ink receiving portion 154a. In the second position, drops of liquid ink 144 drip from the drip point 134 into the wider, open portion of the funnel shaped ink receiving portion 154a'. The liquid phase change ink then flows through the conduit 154 and out through the ink dispensing portion 154b into the ink reservoir 34a of the second printhead 34. By moving the ink source 22 and melter assembly 102 between the first and second positions in this manner, the ink delivery system 100 can supply two printheads with phase change ink in the liquid phase for forming images. The controller 80 can control this movement to keep all the printheads properly supplied with liquid phase change ink. It should be appreciated that by using more conduits having ink receiving portions disposed adjacent each other in this manner, ink can be supplied to more than two printheads.

Various other embodiments of the ink delivery system 100 shall now be described in further detail. In these embodiments, components similar to those previously described are labeled using similar reference numerals. For simplicity, each embodiment shall be described using only one ink source 22 and corresponding melter assembly 102 suitable for supplying one phase change ink 122 in liquid form to a plurality of printheads, though it should be appreciated that the embodiments can be extended to a plurality of ink sources and melter assemblies suitable for supplying a plurality of different phase change inks to a plurality of printheads. Further, while only two printheads, 32 and 34 receive ink using the ink delivery systems as described, these systems can easily be extended to supply ink to more than two printheads. In the following embodiments of the ink delivery system described below, portions of the ink delivery conduits 152, 154, and their corresponding printheads 32, 34 and ink reservoirs 32a, 34a are not shown for simplicity. However, it should be understood that the delivery conduits, printheads and printhead ink reservoirs applicable to the system 100 shown in FIG. 4 are also applicable to the these embodiments.

Figure 5:
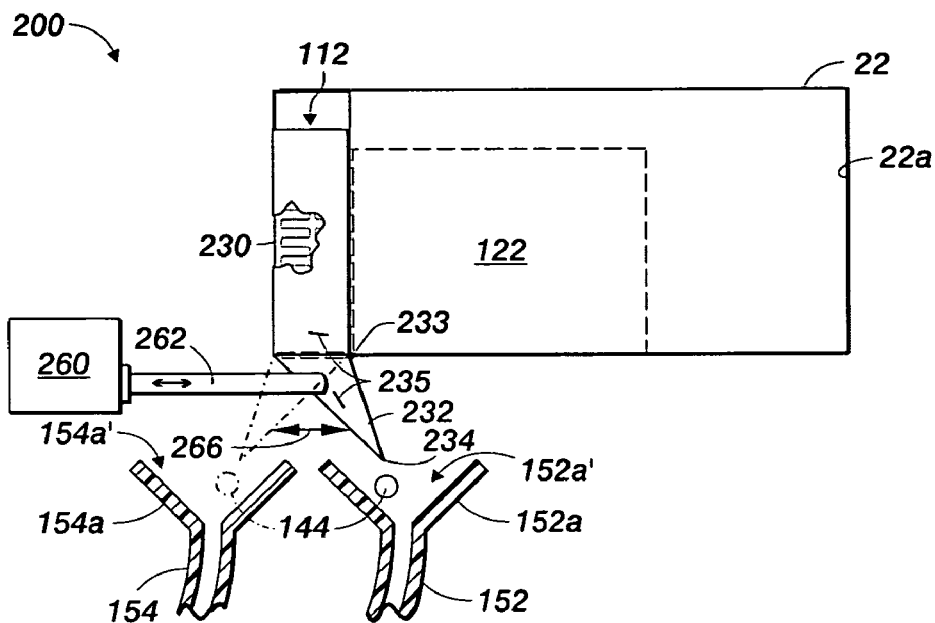
FIG. 5 is a block diagram of an embodiment of the system for delivering phase change ink illustrating pivoting the drip point between first and second positions.

Referring now to FIG. 5, a second embodiment of the ink delivery system is shown generally at 200. The ink delivery system 200 includes one or more ink sources 22, each holding a corresponding phase change ink 122 in the solid phase. The ink delivery system 200 also includes one or more melter plates 112 formed of thermally conductive material for melting the solid phase change ink into liquid form. The melter plate 112 includes an ink contact portion 230 for melting the ink contacting it and a drip point portion 232 having a having a drip point 234 as described above. The drip point portion 232 can be a narrowing portion terminating in the drip point 234. The drip point portion 232 is pivotally attached to the ink contact portion 230 by a pivot connection 233 for pivoting the drip point 234 between a first position, shown in solid lines, and a second position, shown with dot-dashed lines. The melter plate 112 including the contact portion 230 and drip point portion 232 can be covered by a covering material 235 such as rubber, or a rubber-like material, which is flexible enough to allow the drip point portion to pivot with respect to the contact portion while allowing the melted ink to travel from the contact portion to the drip point portion and drip point. Any rubberized, insulative material would suffice and would serve to cover the heater that provides energy to both the stationary and pivoting portions of the melter. In the event that fatigue in the resistive wire becomes an issue at the pivot, separate heaters may be implemented for the stationary and pivoting sections of the heater.

A mover 260, such as a stepper motor or solenoid, among others, is connected to the drip point portion via a linkage 262 for moving the drip point portion 232, including the drip point 234 between the first and second positions. In the first position, the melting plate drip point 234 is disposed above the first conduit ink receiving portion 152a and drops of liquid ink 144 drip from the drip point into the wider, open portion of the funnel shaped ink receiving portion 152a'. The liquid phase change ink then flows through the conduit 152 and out through the ink dispensing portion into the ink reservoir 32a of the first printhead 32.

The mover 260 can move the melting plate drip point portion 232 including the drip point 234 from the first position into the second position, and from the second position into the first position, by translating the linkage 262 shown by arrow 263 thereby pivoting the melting plate drip point portion and drip point as shown by the arrow 266. In the second position, the melting plate drip point 234 is disposed above the second conduit ink receiving portion 154a so that drops of liquid ink 144 drip from the drip point 234 into the wider, open portion of the funnel shaped ink receiving portion 154a'. The liquid phase change ink then flows through the conduit 154 and out through the ink dispensing portion 154b into the ink reservoir 34a of the second printhead 34. By pivoting the ink drip point 234 between the first and second positions in this manner, the ink delivery system 200 can supply two printheads with phase change ink in the liquid phase for forming images. The controller 80 can be used to operate the mover 260 and control the position of the pivot point 134 thereby determining the which printhead receives the liquid phase change ink.

Figure 6:
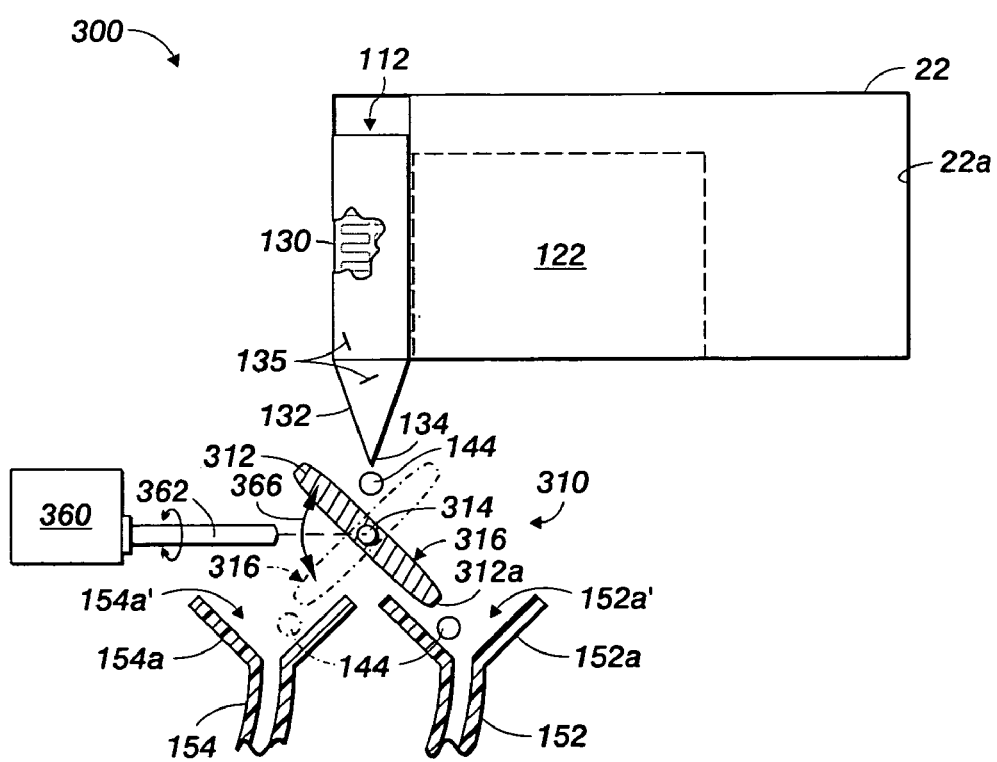
FIG. 6 is a block diagram of an embodiment illustrating pivoting the diverter plate between first and second positions.

Referring now to FIG. 6, another embodiment of the ink delivery system is shown generally at 300. The ink delivery system 300 includes one or more ink sources 22, each holding a corresponding phase change ink 122 in the solid phase similar to those described above. The ink delivery system 300 also includes one or more melter assemblies 102, having melter plates 112 similar to those described in the delivery system 100 described above. The one or more melter plates 112 are formed of thermally conductive material for melting the solid phase change ink into liquid form. The one or more melter plates 112 include an ink contact-portion 130 for melting the ink contacting it and a drip point portion 132 having a having a drip point 134 as described above.

The ink delivery system also includes a diverter 310. The diverter can be a heated diverter plate. The diverter 310 is disposed below the drip point 134 for diverting the liquid ink dripping from the drip point to the one of the ink receiving portions 152a, 154a of the ink delivery conduits. In the embodiment shown in FIG. 6, the heated diverter 310 includes a diverter plate 312 having a centrally disposed pivot connection point 314 providing for pivoting movement of the diverter plate between a first position and a second position as shown by arrow 366. The pivot connection 314 is disposed beneath the drip point 134. A mover 360, such as described above, is connected to the diverter plate 312 via a linkage 362 for pivoting the diverter plate. The mover 360 can connected to the diverter plate 310 in a manner so as to rotate the linkage 362 for pivoting the diverter plate as shown at 366, or it can be connected so as to translate the linkage to affect similar movement.

In the first position, as shown with the solid line, the diverter plate 312 is oriented with a slope sufficient to cause liquid phase change ink dripping from the drip point to flow into the first conduit ink receiving portion 152a. The liquid ink drips onto a first side 316 the sloped diverter plate 312 and runs down the plate and into the ink receiving portion 152a of the first conduit 152. The liquid ink is then transferred by the conduit 152 to the first printhead ink reservoir 32a for use by the first printhead 32 as described above.

The mover 360 can pivot the diverter plate 312 to the second position, as shown with dot-dashed lines, in which it is sloped towards the second conduit receiving portion 154a for diverting liquid ink into the second conduit 154. In the second position, the liquid ink drips onto the first side 316 of the sloped diverter plate 312 and runs down the plate and into the ink receiving portion 154a of the second conduit 154. The liquid ink is then transferred by the second conduit 154 to the second printhead ink reservoir 34a for use by the second printhead 34 as described above. The controller 80 can be used to operate the mover 360 and control the position of the diverter plate 312 thereby determining the which printhead receives the liquid phase change ink.

Figure 7:
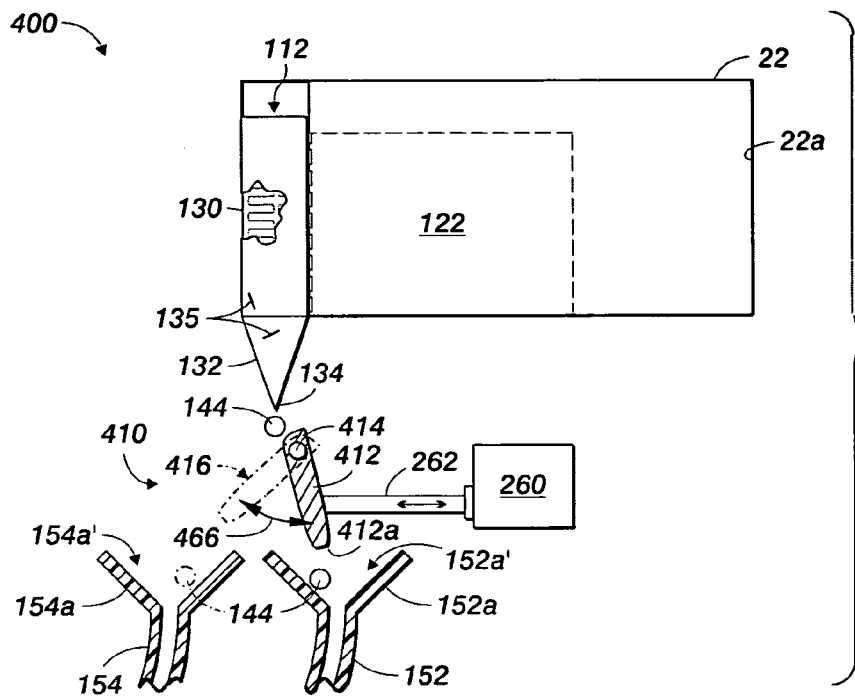
FIG. 7 is a block diagram of an embodiment illustrating pivoting the diverter plate between first and second positions.

Referring now to FIG. 7, another embodiment of the ink delivery system is shown generally at 400. The ink delivery system 400 is similar to the ink delivery system 300 shown in FIG. 6, however, the diverter 410 includes a heated diverter plate 412 having a top end pivot point connection 414 disposed near the upper end of the diverter plate. A mover 260, such as described above, is connected to the diverter plate 412 via a linkage 262 for pivoting the diverter plate between a first position and a second position as shown by arrow 466. In the first position, shown with solid lines, the end 412a of the diverter plate disposed opposite the pivot connection 414 is disposed above the first conduit ink receiving portion 152a. In this position, liquid ink dripping from the drip point 134 drips onto a first side 416 of the sloped diverter plate down the first side and off the end 412a into the ink receiving portion. The ink is then carried in liquid form to the first printhead reservoir 32a for supplying the first printhead 32.

The mover 260 can pivot the diverter plate 412 to the second position in which the plate end 412a is disposed above the ink receiving portion 154a of the second conduit 154. In the second position, liquid ink dripping from the drip point 134 runs down the first side 416 of the sloped diverter plate 412, off of the end 412a and into the ink receiving portion 154a. The ink is then carried in liquid form to the second printhead reservoir 34a for supplying the second printhead 34. The controller 80 can operate the mover 260 for moving the diverter plate 412 between the first and second positions to keep both printheads 32 and 34 supplied with ink for forming images.

Figure 8:
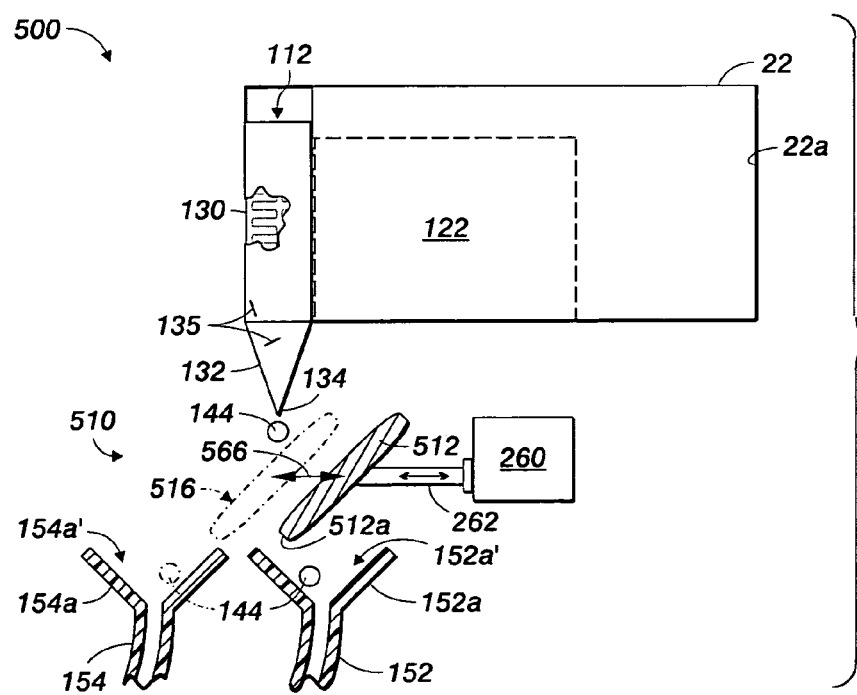
FIG. 8 is a block diagram of an embodiment illustrating translating the diverter plate between first and second positions.

Referring now to FIG. 8, another embodiment of the ink delivery system is shown generally at 500. The ink delivery system 500 is similar to the ink delivery systems 300 and 400, including using a diverter 510 disposed below the drip point 34 for diverting the liquid ink into one of the ink delivery conduits 152, and 154. However, the diverter 510 includes a diverter plate 512 which translates, moving back and forth in a sideways motion as shown by arrow 566, between first and second positions. The diverter plate 512 is sloped at a fixed angle. A mover 260, as describe above, is connected to the diverter plate 512 for moving it. In the first position, shown in solid lines, the lower end 512a of the diverter plate is disposed above the ink receiving portion of the first conduit 152. In this position, ink drips from the drip point 134 onto a first side 516 of the diverter plate 512, runs down the diverter plate 512 and off of the lower end 512a and into the first conduit 152. The ink is then carried in liquid form to the first printhead reservoir 32a for supplying the first printhead 32.

The mover 260 can move the diverter plate 512 into the second position as shown by the dot-dashed lines. In the second position, the lower end 512a of the diverter plate is disposed above the ink receiving portion 154a of the second conduit 154. In this position, ink drips from the drip point 134 onto the first side 516 of the diverter plate 512, runs down the diverter plate and off of the lower end 512a and into the second conduit 154. The ink is then carried in liquid form to the second printhead reservoir 34a for supplying the second printhead 32.

The system for delivering phase change ink described above delivers ink in liquid form to a plurality of different printheads for forming images. The system can utilize a single source of phase change ink, including a single housing for storing the phase change ink in solid form. A plurality of different phase change inks can be delivered, each to a plurality of printheads. The system can simultaneously deliver the plurality of different phase change inks.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for delivering phase change ink to a plurality of printheads comprising:
an ink source having a housing for holding solid phase change ink;
an ink melter assembly having a heated ink contact portion for melting the solid phase change ink and a drip point;
a first conduit for transferring the melted ink to a first printhead, the first conduit having an ink receiving portion for receiving the melted ink from the drip point;
a second conduit for transferring the melted ink to a second printhead, the second conduit having an ink receiving portion for receiving the melted ink from the drip point; and
a mover connected to the ink melter assembly for moving the drip point between a first position wherein the first conduit ink receiving portion receives ink from the drip point and a second position wherein the second conduit ink receiving portion receives ink from the drip point.

2. The system defined in claim 1 wherein the drip point is pivotable between the first position wherein the drip point is disposed above the first conduit ink receiving portion and the second position wherein drip point is disposed above the second conduit ink receiving portion.

3. The system defined in claim 1 wherein the mover is connected to the ink source and the ink melter assembly for moving the ink source and the ink melter assembly between a first position wherein the first conduit ink receiving portion receives ink from the drip point and a second position wherein the second conduit ink receiving portion receives ink from the drip point.

4. The system defined in claim 1 wherein the mover is at least one of a motor and a solenoid.

5. The system defined in claim 1 wherein the first and second conduits are heated.

6. The system defined in claim 1 further comprising:
a plurality of ink sources each corresponding to a different phase change ink;
a plurality of heater plates each corresponding to a different ink source and having a heated portion and a drip point; and
a plurality of groups of first and second conduits, each group of first and second conduits corresponding to a different ink source for transferring a phase change ink to first and second printheads.

7. A phase change ink image producing machine having first and second printheads comprising:
an ink source having a housing for holding solid phase change ink;
an ink melter assembly having a heated ink contact portion for melting the solid phase change ink and a drip point;
a first conduit for transferring the melted ink to a first printhead, the first conduit having an ink receiving portion for receiving the melted ink from the drip point;
a second conduit for transferring the melted ink to a second printhead, the second conduit having an ink receiving portion for receiving the melted ink from the drip point; and
a mover connected to the ink melter assembly for moving the drip point between a first position wherein the first conduit ink receiving portion receives ink from the drip point and a second position wherein the second conduit ink receiving portion receives ink from the drip point.

8. A phase change ink image producing machine having first and second printheads comprising:
an ink source having a housing for holding solid phase change ink;
an ink melter assembly having a heated ink contact portion for melting the solid chase change ink and a drip point;
a first conduit for transferring the melted ink to a first printhead, the first conduit having an ink receiving portion for receiving the melted ink from the drip point;
a second conduit for transferring the melted ink to a second printhead, the second conduit having an ink receiving portion for receiving the melted ink from the drip point; and
a diverter disposed between the drip point and the first and second conduit receiving portions, the diverter having a first position for diverting ink from the drip point to the first conduit ink receiving portion for transferring ink to the first printhead and a second position for diverting ink from the drip point to the second conduit ink receiving portion for transferring ink to the second printhead.

9. A method of transferring a phase change ink to first and second printheads for forming an image comprising:
melting a solid phase change ink into a liquid phase with a melter having a drip point; and
moving the drip point between a first position for transferring the liquid phase change ink to the first printhead in the first conduit and a second position for transferring the liquid phase change ink to the second printhead in the second conduit.

10. The method defined in claim 9 further comprising storing the solid phase change ink in a single ink source.

11. A method of transferring a phase change ink to first and second printheads for forming an image comprising:
melting a solid phase chance ink into a liquid chase with a melter having a drip point;
moving a diverter to a first position for diverting the ink to the first conduit; and
moving the diverter to a second position for diverting the ink to the second conduit.

12. The method defined in claim 11 wherein the diverter includes a diverter plate and step of moving the diverter to a first position includes pivoting the diverter plate and the step of moving the diverter to a second position includes pivoting the diverter plate.

13. The method defined in claim 11 wherein the diverter includes a diverter plate and the steps of moving the diverter to the first and second positions includes translating the diverter plate.

14. A system for delivering phase change ink to a plurality of printheads comprising:
an ink source having a housing for holding solid phase change ink;
an ink melter assembly having a heated ink contact portion for melting the solid phase change ink and a drip point;
a first conduit for transferring the melted ink to a first printhead, the first conduit having an ink receiving portion for receiving the melted ink from the drip point;
a second conduit for transferring the melted ink to a second printhead, the second conduit having an ink receiving portion for receiving the melted ink from the drip point; and a diverter disposed between the drip point and the first and second conduit ink receiving portions, the diverter having a first position for diverting ink from the drip point to the first conduit ink receiving portion for transferring ink to the first printhead and a second position for diverting ink from the drip point to the second conduit ink receiving portion for transferring ink to the second printhead.

15. The system defined in claim 14 wherein the diverter is a plate having a central pivot point, the plate pivoting about the pivot point between the first position and the second position.

16. The system defined in claim 14 wherein the diverter is a plate having a pivot point disposed at an upper end of the plate, the plate pivoting about the pivot point between the first position and the second position.

17. The system defined in claim 14 wherein the diverter is a sloped plate for translating between the first position and the second position.

\* \* \* \* \*